May 15, 1923.  1,455,634
F. W. McARDLE
MACHINE FOR MOLDING ARTICLES FROM PLASTIC MATERIAL
Filed May 2, 1919   5 Sheets-Sheet 1

INVENTOR
Fred W. McArdle

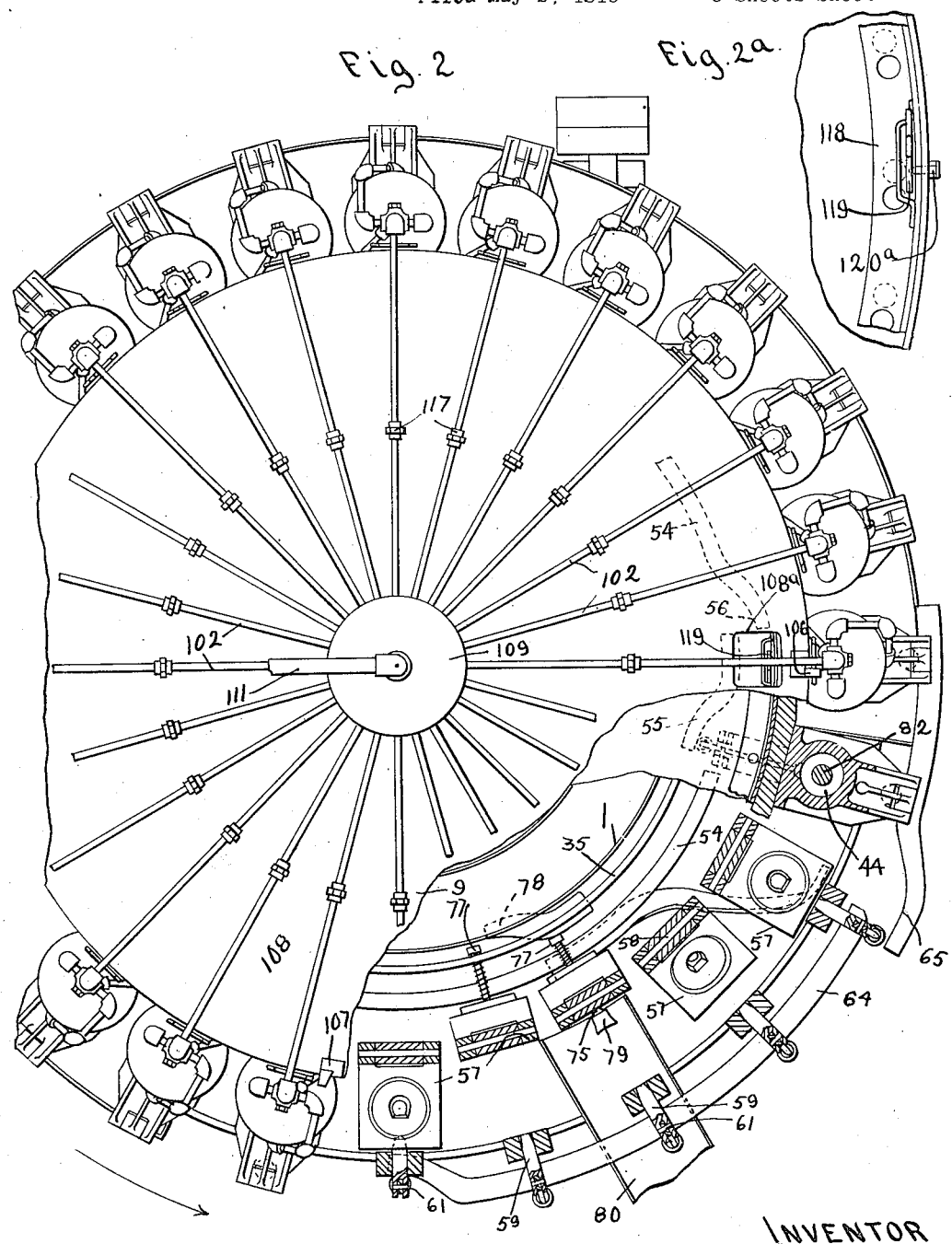

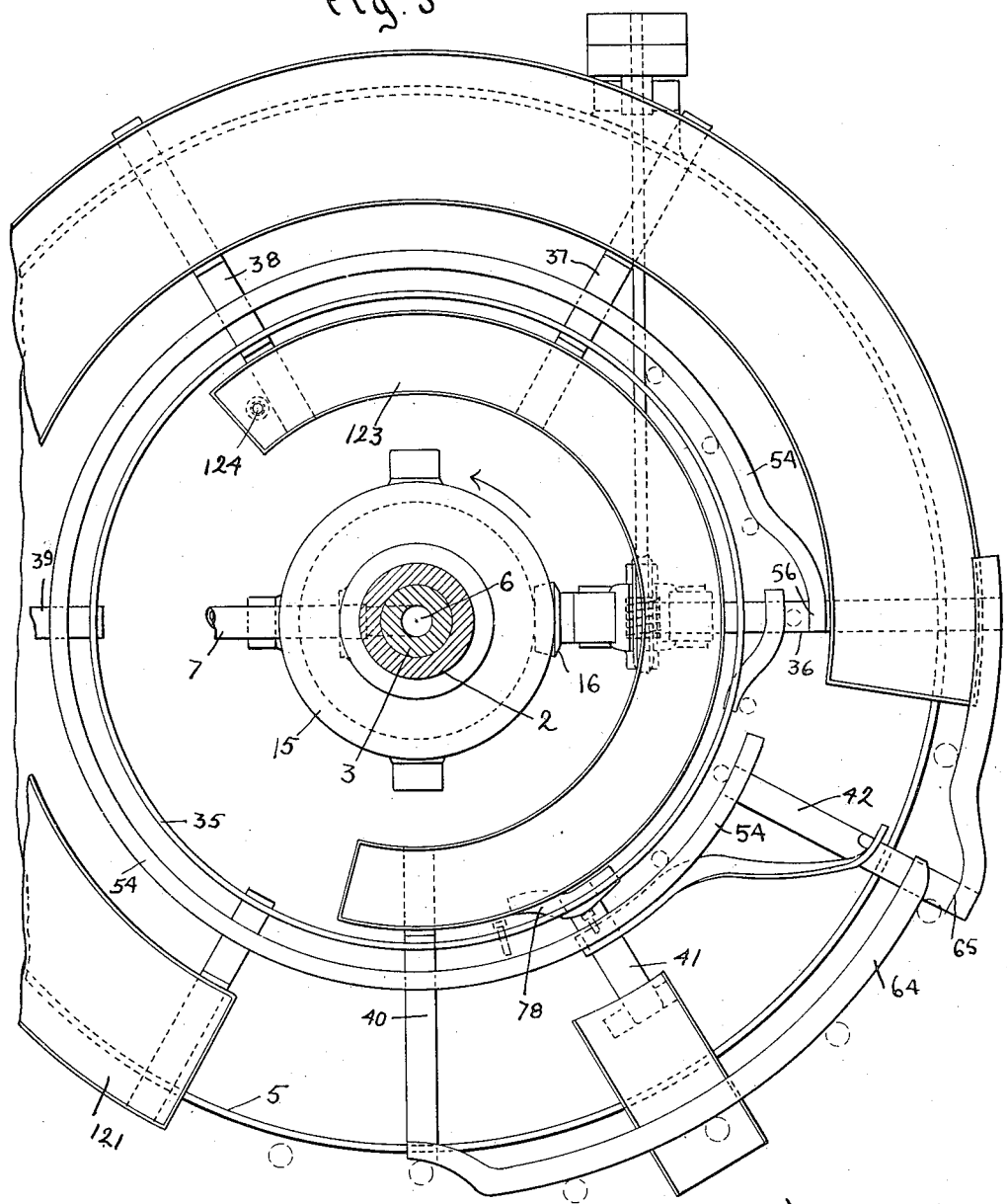

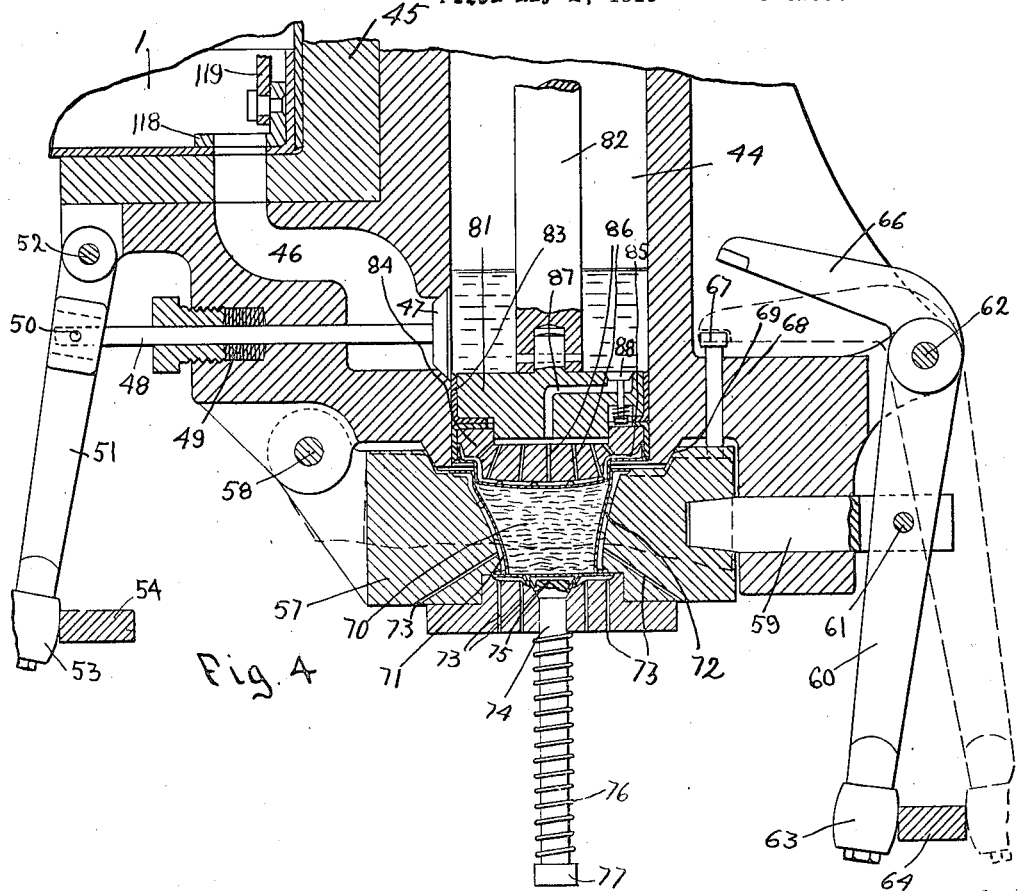
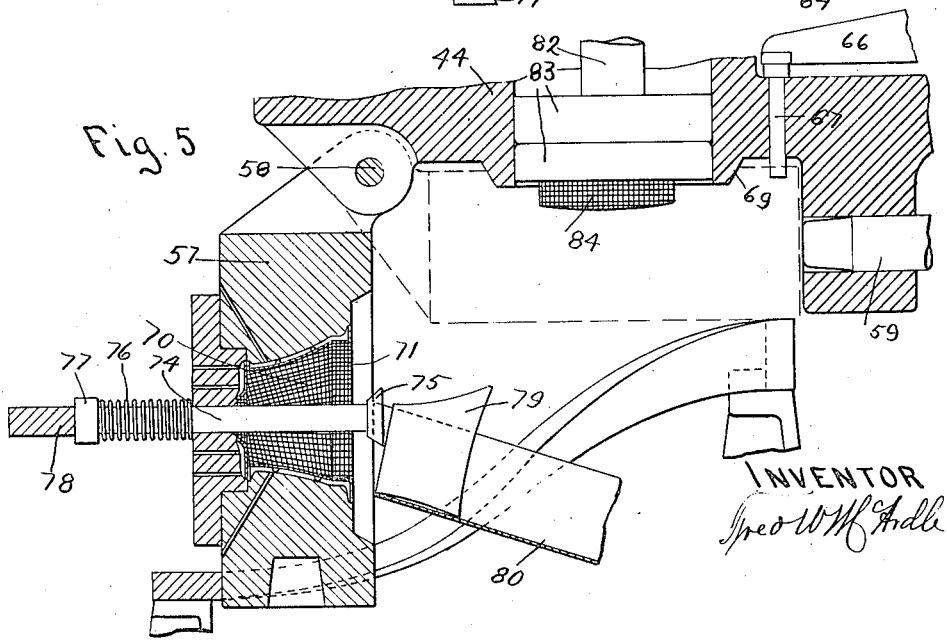

May 15, 1923.

F. W. McARDLE 1,455,634

MACHINE FOR MOLDING ARTICLES FROM PLASTIC MATERIAL

Filed May 2, 1919 5 Sheets-Sheet 5

INVENTOR
Fred W. McArdle

Patented May 15, 1923.

1,455,634

UNITED STATES PATENT OFFICE.

FRED W. McARDLE, OF BOSTON, MASSACHUSETTS.

MACHINE FOR MOLDING ARTICLES FROM PLASTIC MATERIAL.

Application filed May 2, 1919. Serial No. 294,286.

*To all whom it may concern:*

Be it known that I, FRED W. MCARDLE, a citizen of the United States, residing at Boston, in the county of Suffolk and State of Massachusetts, have invented certain new and useful Improvements in Machines for Molding Articles from Plastic Material, of which the following is a specification.

One object of my invention is to provide a machine with automatic means for molding from wood pulp or similar material, such articles as boot heels, cups, plates and the like.

A further object is to provide a machine of the above character, adaptable to mould various articles, by suitable substitution of parts.

A further object of my invention is to provide a machine of the above character that shall be, self-contained and continuous in its action, such that an article will be discharged from one pressure unit, while another is being formed, and a third unit is being supplied with plastic material. Further objects and novelties of combination and construction of the several parts will be hereinafter set forth in the specifications and claims and in the accompanying drawings forming a part thereof.

In the drawings:

Fig. 2 is a plan.

Fig. 2<sup>A</sup> is a segmental portion of the bottom of reservoir.

Figure 1:
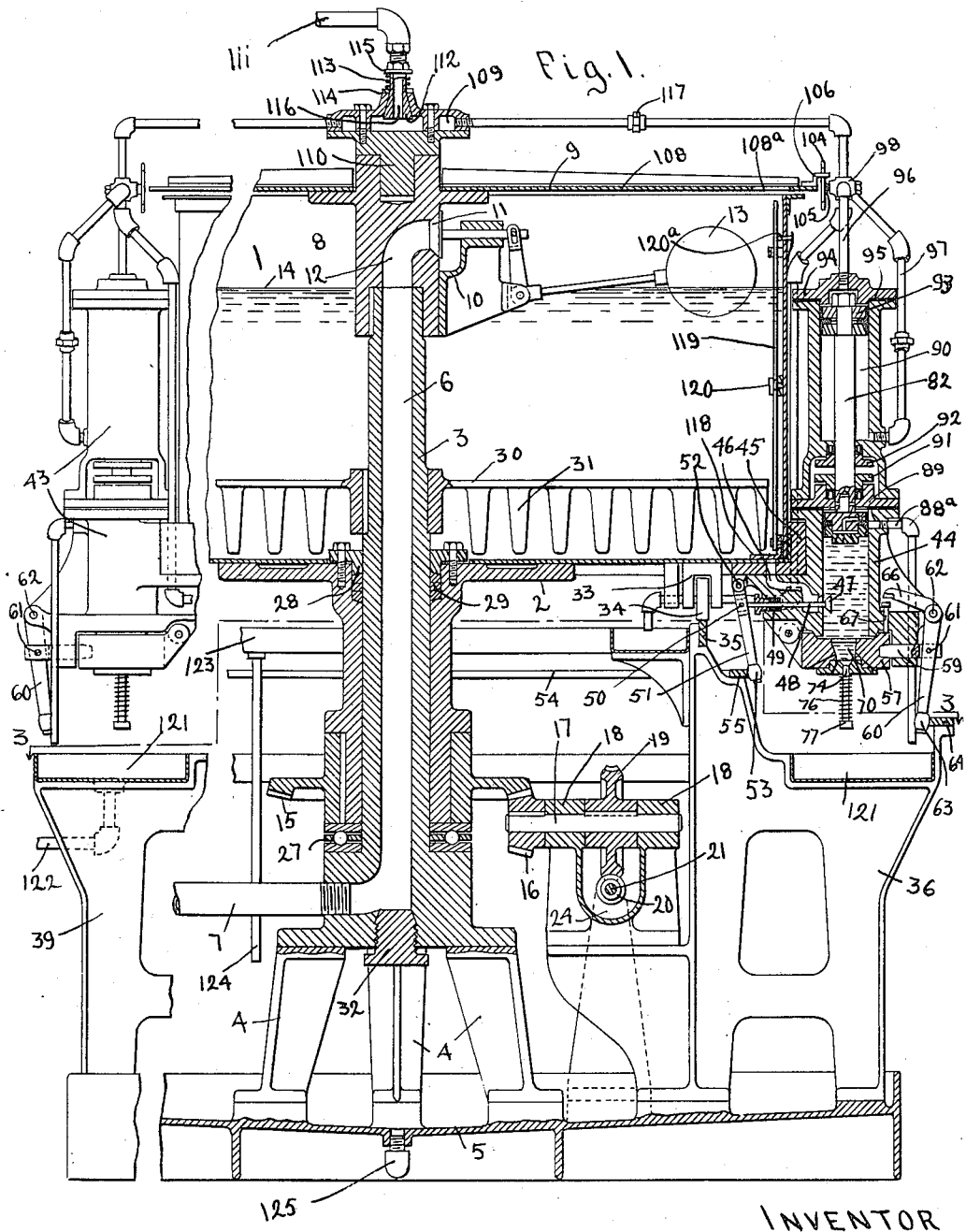
Fig. 1 is a sectional side elevation.

Fig. 3 is a plan on line 3—3 Fig. 1.

Fig. 4 is an enlarged sectional elevation of a portion of the pressure unit.

Fig. 5 is an enlarged sectional elevation of the mould portion of the pressure unit in position for discharging the molded article.

Figure 6:
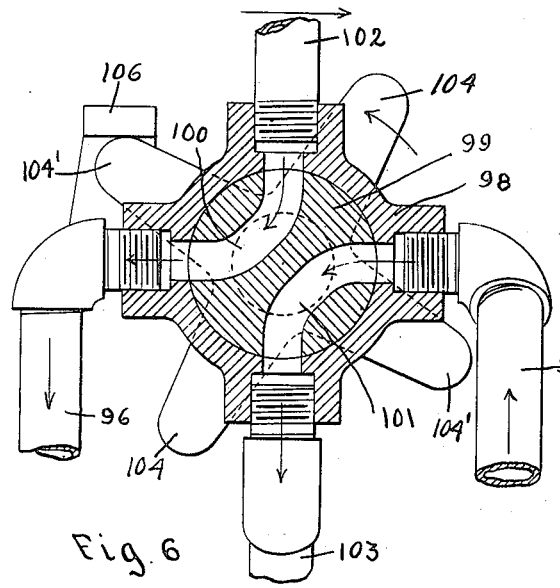
Figure 7:
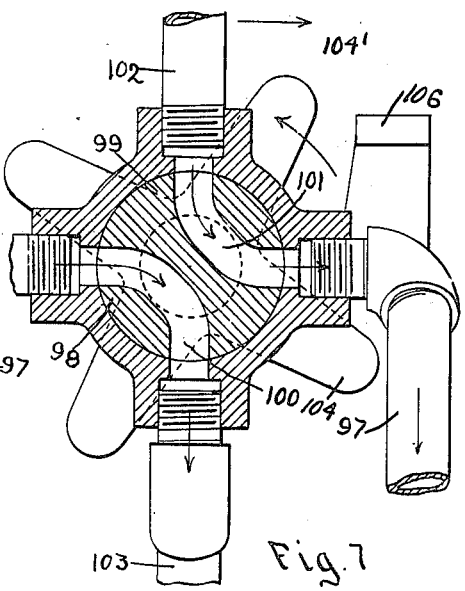

Figs. 6 and 7 are enlarged sections of the hydraulic control valve.

Figure 8:
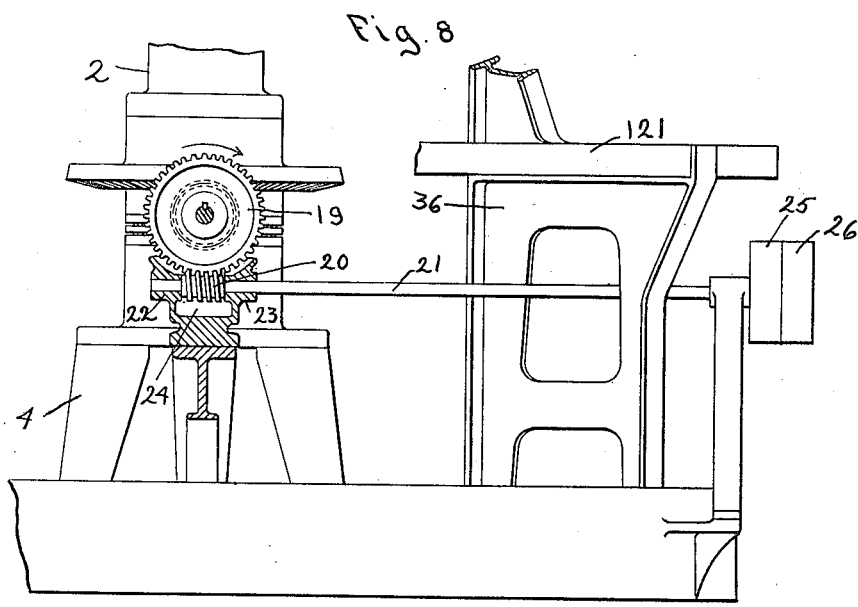

Fig. 8 is a sectional elevation of the driving mechanism.

In the drawings 1 is a reservoir for holding the pulp or other plastic material. This reservoir is mounted on the flanged member 2 journalled on the column 3 which is supported by the legs 4, secured to the base of the machine 5, formed to catch the waste water from the machine.

The column 3 is formed with a duct 6, through which pulp or similar fluid material is introduced into the reservoir 1, the pipe 7 serving to connect the duct with a main source of supply.

Secured to the upper end of the column 3 is a head 8, which is flanged to support the cover 9, and is provided with the bracket 10, in which is journaled the stem of the valve 11, seated in the end of a chambered portion 12, forming an extension of the duct 6. This valve is operated by the float 13, to admit pulp, as the level of the pulp 14 in the reservoir is lowered in supplying pulp to the molding devices to be described.

The reservoir is rotated by means of the gear 15 secured to the flanged member 2, and meshing with the pinion 16, rigidly mounted on a shaft 17, journaled bearings 18 suitably supported from the base 5.

Secured to this shaft is the worm gear 19, meshing with the worm 20 (Fig. 8.) rigid with the shaft 21, which has bearings at 22, 23 (Fig. 8), a chamber being formed at 24, into which a supply of lubricant may be introduced. The shaft 21 is rotated by means of the tight and loose pulleys 25, 26 in an ordinary manner.

The rotating members 1, 2 and 15 are supported on the anti-friction bearing 27, (Fig. 8) and leakage between the column and the bearing is provided against by means of the packing gland 28 which serves to hold the packing 29 in the recess in the upper end of the member 2. Secured to the column 3 at a suitable distance above the bottom of the reservoir are the arms 30 from which extend the projections 31 which serves to agitate the pulp as the reservoir is rotated, and thus maintain an uniform density of the plastic mass.

The duct 6 is extended through the bottom of the column 3 and is closed by the plug 32 which may be removed to permit the emptying of the duct when the machine is not in use.

Secured to the bottom of the reservoir 1 is a plurality of brackets 33 in which are journaled the rollers 34 which bear on the track 35, supported on standards 36 to 42 (Fig. 3) secured to projections from the base 5 (Fig. 3). These rollers serve to steady the reservoir as it is rotated.

The reservoir 1 is provided on its exterior with a plurality of units 43 into which the pulp is admitted and wherein the article required is moulded.

Each unit is composed as follows:— 44 is a chamber rigidly secured to the wing 45 which forms a part of the reservoir 1.

The duct 46 connects the interiors of the chamber and the reservoir and the flow of pulp from the reservoir is controlled by means of a valve 47 (Figs. 1 and 4), secured to the stem 48, bearing in a projection from the chamber 44, and packed at 49 in the customary manner.

The outer end of the stem 48 is connected by means of the pin 50 to the lever 51 fulcrumed at 52 to a fork formed on the chamber 44. The other end of lever 51 is provided with the roll 53 journalled on an extension thereof, and bearing against the cam track 54 (Fig. 3) secured to the standards 36—42. This cam track is interrupted at the part of the cycle where the valve is to be opened and the cooperating switch 55 is introduced and secured to the standard 36. The roll 53 bearing on this switch operates to open the valve permitting the pulp to flow into the chamber from the reservoir. As the roll engages the track 54 at 56 the valve is closed and held closed as the roll engages the inner surface of the track 54 (Fig. 4).

One end of the chamber 44 is provided with closure 57 (Figs. 4, 5) hinged at 58 and locked when closed by means of the bolt 59, having a sliding bearing in a projection from the chamber 44.

Bolt 59 is loosely connected to the lever 60 by means of a pin 61. This lever is fulcrumed at 62 in a fork projecting from the exterior of the chamber 44. On one end of the lever 60 is journaled the roll 63 which engages the cam track 64.

It is not deemed necessary that the roll shall engage the track 64 throughout the cycle, and it therefore engages only during the interval during which the closure is to be opened and again closed.

A second segment 65 is then engaged by the roll and is so formed as to operate the roll and thus lock the cover. The locking lever is then out of engagement with the track until the position is reached in the cycle at which it is desired to unlock the cover, when the roll engages the track and is operated to release the bolt from engagement with the closure.

The lever 60 is provided with an extension 66, adapted to engage the pin 67, which extends through the flange 68 of the chamber, and abuts the closure 57, for the purpose of assisting the opening thereof.

The closure is recessed at 69 to make a suitable joint with a corresponding projecting portion of the chamber, and formed in the closure is a depression 70 of the shape desired to mould the article required.

This depression is provided with a lining of perforated or woven material 71 for drainage purposes. Drainage passages 72 underlying the drainage lining are connected with ducts 73, and through these the diluting liquid may escape from the fluid pulp. Provision is made for a plunger 74 extending through the closure, the end 75 being held normally, flush with the inner surface of the mould, by means of the spring 76. The outer end 77 of this plunger is adapted to engage an abutment 78 (Fig. 2) when the closure is opened, for the purpose of forcing the solidified form 79 from the mold and onto a chute 80.

Operating longitudinally of the cylinder by means hereafter described is the piston 81, secured to the piston rod 82 and packed by means of suitable packing rings 83, to insure water-tight conditions between the two sides of the piston.

Mounted on the end of the piston is the head 84, the surfaces contiguous to the mold being adapted to co-act therewith to form the article to be moulded. These surfaces are covered in a similar manner to the lining of the mold, and with similar drainage channels 85 and ducts 86 discharging into a main duct 87 which is normally closed by the valve 88 seated in the piston and adapted to permit the passage of the expressed fluid from the diluted pulp mass. This fluid is discharged from the chamber 44 when the ram 81 is retracted, through an overflow pipe 88$^a$. The piston rod 82 extends through the head 89 and into the cylinder 90, the head and cylinder both being secured to the upper end of the chamber 44. Packing glands 91—92 with suitable packing, insure water-tight conditions. The opposite end of the piston rod 82 is provided with a piston 93 suitably packed to permit hydraulic action on either side of the piston.

The upper end of the cylinder 44 is covered by means of the head 89, secured to the end of the cylinder and suitably packed to prevent leakage, and to this head is secured the cylinder 90 the upper end of which is closed by means of the cover 94 the joint being packed against leakage by the packing ring 95.

As the axis of cylinder 90 is a continuation of the axis of the chamber 44, it follows that pressure exerted axially on the piston 93, is transmitted through piston rod 82 to ram 81. Preferably this is accomplished by means of hydraulic pressure, the pipe 96 admitting water to the top of piston 93, and pipe 97 to the under side, for the purpose of retracting the piston and connected parts.

These pipes are connected at their opposite end with ports formed in the valve casing 98.

In this casing is fitted the plug 99 provided with ducts 100, 101 adapted to align with ports leading to pipes 96, 97 and at their opposite ends to align with ports leading to supply pipe 102 and discharge pipe 103. The plug 99 is so constructed, that the ports may connect either end of the cylinder with the water supply 102 and at the same time connect the other end with ducts in valve casing from which pipes 96, 97 extend to the cylinder. Similar ducts in the valve casing, connected respectively with supply pipe 102 and discharge pipe 103, are suitably arranged to permit the passages 100 and 101 to connect either pipe 96 or 97 with either pipe 102 or 103, the port in the plug being so formed, that when passage 100 connects pipes 96 and 102, passage 101 connects pipes 97 and the waste pipe 103, thus permitting the application of hydraulic pressure to either side of the piston, while a free outlet is provided for water to escape from the other side, through the pipe 103, the pipes 96, 97 acting alternately as supply and discharge pipes according as the piston is to be forced downward or retracted.

As the pressure units are rotated with the reservoir 1, the valve plug 99 is operated step by step, by means of a spoked hub secured to an extension 105 of the plug, the spokes 104, 105 engaging suitable abutments 106, 107 (Figs. 1 and 2) secured to the cover 108 of the reservoir or other suitable stationary support. In this construction the cover 108 is shown in Figs. 1-2 as being supported by, and secured to the head 8, and the abutments 106, 107 are suitably placed to engage the spoked hubs of each unit, to operate the valve plugs 99 as the reservoir is rotated, alternately admitting water under pressure to each side of the piston 93, the abutment 106, operating to supply through pipe 96 and intermediate parts, the necessary pressure to express the fluid contents of the pulp, and retain the pressure until the spoked wheel engages abutment 107, when the plug is rotated to admit the water under pressure to the underside of piston 93 and return the ram to its initial position.

Fig. 6 shows the position of this valve when water is admitted to the top of the piston 104, having engaged the abutment 106, as the unit passed it in its cycle of operations. The water under pressure passing from the supply pipe 102 along the line of the arrows while the waste water from the other side of piston escapes through pipes 97 and 103.

Fig. 7 shows the position of parts previous to the engagement of spoke 104' with abutment 106.

The supply pipes 102 from each pressure unit, terminate in a manifold 109, pivotally mounted at 110 on the head 8, and the manifold is supplied with water under pressure through the main 111.

The supply main is connected with the manifold 109 by means of a taper plug 112, seating in a corresponding socket in the manifold, which permits the manifold to rotate without leakage, the joint being assured by means of the tension spring 113 as shown, on an extension of plug 112, and operating between washers 114 and 115, to hold the plug firmly in its seat while permitting rotation thereof.

Through the plug extends the duct 116 providing a passage from the main 111 to the interior of the manifold 109.

For purposes of assembling pipe unions 117, are used where necessary.

To provide for intervals when the apparatus is not in operation, there is provided a ring 118 bearing on the interior of the bottom of the reservoir, the ring being provided with openings 119, normally in alignment with the ducts 46. The ring is adapted to be rotated sufficiently to move the openings out of alignment with the ducts 46, and so act as a gate between the reservoir and the molding units, and to secure easy rotation of this ring, I have provided a lever 119 pivoted to the shell of the reservoir at 120 with a suitable opening 108ª in the cover through which it may be operated. A suitable detent 120ª is provided whereby the gate may be retained in open or closed position.

This is a desirable feature as it is essential that the flow of the pulp to the pressure units be stopped when changing dies or when the machine is not in operation, in order that solid pulp may not settle in the ducts.

As it may be desirable to save the fluid content of the pulp, as it is expressed, there is provided a trough 121 (Fig. 1) into which the overflow pipes 88^A from the mold chamber discharge. From this trough the pipe 122 conducts the fluid away to a suitable container.

A similar trough 123 may be provided to receive the overflow from the pressure cylinders, a waste pipe 124 being provided to discharge into the basin formed in the base 5. This basin is preferably dished in order that waste water and dripping may flow to a discharge pipe 125 which carries it away from the machine.

The operation of this machine is as follows:—The machine is started and if pulp from a previous operation remains in the reservoir, it is allowed to rotate until the stationary agitator secured to central column has operated to stir the pulp into an even consistency, the solid contents of pulp tending to sink when not constantly agitated. The valve controlling the pulp supply may be opened at any time, the ball valve controlling the amount admitted to the reservoir. When the pulp is in a suitable state the gate 118 closing the ducts to the pressure units, is opened, permitting the pulp to flow into all units subject to the controlling valves operating each unit.

By the action of the cam tracks, pulp is admitted into each chamber, and as the chamber rotates the pulp valve closes and the hydraulic pressure applied. Pressure is continued during a considerable part of the rotation and then released, the cam with its follower being retracted.

A further advance, releases the bolt locking the closure to the chamber, and the closure with the mold swings downward, containing the formed article, the stem of the plunger engaging a cam plate and forcing the formed article from the mold into a chute or hopper. The empty mold in its advance is closed by a portion of its cam track and locked by means of the locking bolt, operated by its cam track.

Each pressure unit as it rotates is acted upon in the manner described, and the process is continuous. When it is desired to cease operations the gate 118 is operated to close the passages leading to the pressure units, and as the rotation of the reservoir and units is continued, the passages are drained of the remaining pulp.

The machine may now be stopped, the main pulp valve closed, and dies and followers in the pressure units changed if desired.

Having thus described my invention, what I claim as new and desire to secure by Letters Patent is:

1. A machine for forming articles from plastic material comprising forming devices; ducts connecting the forming devices with a source of supply; the forming devices and ducts being movably related to means for opening and closing the ducts; to independent means for operating the forming devices and to means for ejecting the formed articles from the forming devices.

2. A machine for forming articles from plastic material, comprising forming devices; ducts connecting the devices with a source of supply; the forming devices and ducts being rotatable relative to means for automatically opening and closing the ducts; to independent means for automatically operating the forming devices; and to means for forcing the formed articles from the machine.

3. A machine for forming articles from plastic material, comprising a supply reservoir; forming devices; ducts connecting said reservoir and forming devices; reservoir forming devices and ducts, being rotatable relative to means for automatically opening and closing the ducts; to independent means for automatically operating the forming devices; and to means for forcing the formed articles from the machine.

4. A machine for forming articles from plastic material, comprising a supply reservoir; forming devices; ducts connecting the forming devices and the reservoir; means for automatically supplying the reservoir with plastic material; means for automatically opening and closing the ducts; independent means for operating the forming devices, and means for ejecting the formed article from the machine.

5. A machine for forming articles from plastic material, comprising a source of supply; forming devices operating under uniform pressure; ducts connecting the source of supply and the forming devices; the source of supply, ducts, and forming devices being rotatable relative to means for opening and closing the ducts; to independent means for operating the forming devices; and to means for forcing the formed article from the machine.

6. A machine for forming articles from plastic material, comprising a supply reservoir; forming devices adaptable to produce a variety of forms; ducts connecting said reservoir and forming devices; reservoir, forming devices and ducts being rotatable relative to means for automatically opening and closing the ducts; to means for automatically operating the forming devices; and to means for forcing the formed articles from the machine.

7. A machine for forming articles from plastic material, comprising a supply reservoir; forming devices, ducts connecting said reservoir and forming devices; means for opening and closing the outlets from the reservoir to the ducts; reservoir, forming devices and ducts being rotatable relative to means for automatically opening and closing the inlets to the forming devices; to means for automatically operating the forming devices, and to means for forcing the formed articles from the machine.

8. A machine for forming articles from plastic material, comprising a plurality of chambers; forming devices operable within the chambers; ducts connecting the forming devices with a source of supply; all rotatable relative to means for automatically opening and closing the ducts; to adjustable means for automatically operating the forming devices; and to means for forcing the formed articles from the machine.

9. A machine for forming articles from plastic material, comprising a supply reservoir; forming devices; ducts connecting said reservoir and forming devices; means for automatically opening and closing the ducts; independent means for automatically operating the forming devices and means for forcing the formed articles from the machine, all such means operating successively on the forming devices and ducts whereby all operations are performed successively in each chamber in continuous cycles.

10. A machine for forming articles from plastic material, comprising a supply reservoir; a plurality of chambers; forming devices operable within the chambers; ducts connecting said reservoir and forming devices; means rotatable relative to said chambers for automatically opening and closing the ducts; to adjustable means for automatically operating the forming devices; and to means for forcing the formed articles from the machine.

11. A machine for forming articles from plastic material, comprising a supply reservoir; a plurality of chambers; forming devices operable within the chambers; ducts connecting the forming devices and the reservoir; means rotatable relative to the chambers for opening and closing the ducts; independent means for automatically operating the forming devices; and means for ejecting the formed article from the machine.

12. A machine for forming articles from plastic material, comprising a plurality of chambers; ducts connecting the chambers with a source of supply a valve operating within each duct; a plunger in each chamber, adapted to co-act with a former for the purpose specified; all rotatable relative to means for automatically opening and closing the valves in the ducts; to means for automatically operating the plungers; and to means for forcing the articles from the machine when formed.

13. A machine for forming articles from plastic material, comprising a plurality of chambers, forming devices; ducts, connecting said devices with a source of supply, each forming device comprising a plunger, provided with a head adapted to co-act with a corresponding former, for the purposes specified; ducts through each head and former to permit the escape of surplus fluid from the enclosed plastic mass, the ducts through the head connecting with a chambered portion of the plunger; an outlet from this chamber provided with a closure adapted to permit the escape of fluid from the chamber; means for opening and closing the ducts; means for automatically operating the forming devices and means for discharging the formed articles from the machine.

14. A machine for forming articles from plastic material comprising a plurality of chambers, connected by ducts with a source of supply, a plunger in each chamber adapted to co-act with a former secured to, and forming a closure to the chamber, and capable of being released to permit the discharge of the formed article; means for automatically opening and closing the ducts; means for automatically operating the plungers, and means for automatically releasing and locking the formers to the chambers.

15. A machine for forming articles from plastic material, comprising a plurality of chambers; ducts connecting the chambers with a source of supply; a plunger in each chamber adapted to coact with a former, hinged to the chamber and forming a closure thereto when locked in position; means for opening and closing ducts; independent means for operating the plungers; and means for locking the formers in position and unlocking them to permit the discharging of the formed article from the formers.

16. A machine for forming articles from plastic material, comprising a plurality of chambers, connected by ducts with a source of supply, a plunger in each chamber adapted to co-act with a former secured to and forming a closure to the chamber, means forming a part of the former for releasing the formed article therefrom; means for automatically opening and closing the ducts; means for automatically operating the plungers; means for automatically operating the releasing device in the formers and means for automatically discharging the formed article from the machine.

17. A machine for forming articles from plastic material, comprising a plurality of chambers, connected by ducts with a source of supply, pressure devices within the chambers; means for operating the pressure devices by fluid pressure from a source of supply, means for automatically opening and closing the ducts; means for automatically controlling the fluid pressure acting on the forming devices, and means for automatically discharging the formed articles from the machine.

18. In a machine for forming articles from plastic material, a plurality of forming devices operated by fluid pressure supplied through a manifold; the forming devices and the manifold being rotatable relative to means for supplying fluid to the manifold.

19. A machine for forming articles from plastic material, comprising a plurality of chambers, ducts connecting the chambers with a source of supply; pressure devices within each chamber operated by fluid pressure supplied through a manifold; the chambers, supply reservoir and manifold being rotatable relative to means for supplying the plastic material to the reservoir; to means for supplying fluid to the manifold; to means for opening and closing the ducts leading to the chambers; to means for controlling the operation of the pressure devices; and to means for discharging the formed articles from the machine.

20. A machine for forming articles from plastic material comprising a reservoir, a plurality of forming devices; ducts connecting the reservoir and the forming devices; independent ducts connecting the forming devices with a source of supply through which fluid under pressure may be admitted to the forming devices; the reservoir and forming devices being rotatable relative to a supporting column, chambered to permit the passage of plastic material into the reservoir; rotatable relative to the source of fluid supply; to means for opening and closing the ducts connecting the reservoir and the pressure devices; to means for controlling the fluid supply to the forming devices; and to means for discharging the formed articles from the machine.

21. A machine for forming articles from plastic material, comprising a supply reservoir; a support chambered to permit the passage of plastic material into the reservoir; means for controlling the supply thereto; a plurality of chambers; forming devices within the chambers; ducts connecting the forming devices and the reservoir ducts connecting the forming devices with a manifold through which fluid may be supplied for the purpose of operating the forming devices; the reservoir, chambers, manifold and ducts being rotatable relative to the support; to means for opening and closing the ducts connecting the forming devices and the reservoir; to means for controlling the supply of fluid for operating the forming devices and to means for discharging the formed article from the machine.

22. A machine for forming articles from plastic material, comprising a supply reservoir; forming devices; ducts connecting said reservoir and the forming devices; ducts connecting the forming devices and a source of supply, and through which fluid under pressure may be admitted to the forming devices; all being rotatable relative to guides substantial concentric with the axis of rotation; such guides being provided with suitable depressions and elevations, for the purpose of engaging means for opening and closing the ducts; connecting the reservoir and the chambers; means for controlling the flow of fluid supplied to the forming devices; means for opening and closing the ducts; means for locking and unlocking the closures to the chambers; and means for discharging the formed articles from the machine.

In testimony whereof I have affixed my signature, in presence of two witnesses.

FRED W. McARDLE.

Witnesses:
ANDREW J. NILNO,
GEORGE H. NIXON.